United States Patent [19]
Takeuchi

[11] 3,783,465
[45] Jan. 8, 1974

[54] CAR WHEEL WASHING APPARATUS

[75] Inventor: Shigeo Takeuchi, Nagoya, Japan

[73] Assignee: Takeuchi Tekko Kabushiki Kaisha, Nagoya, Japan

[22] Filed: June 2, 1971

[21] Appl. No.: 149,228

[30] Foreign Application Priority Data
June 3, 1970 Japan.............................. 45/53996

[52] U.S. Cl. .......................... 15/21 E, 15/DIG. 2
[51] Int. Cl. .............................................. B60s 3/06
[58] Field of Search...................... 15/DIG. 2, 21 D, 15/21 E, 53, 97, 21 R, 21 C

[56] References Cited
UNITED STATES PATENTS
3,304,565   2/1967   Fuhring........................... 15/DIG. 2
3,305,886   2/1967   Fricke............................... 15/21 D
3,526,012   9/1970   Cirino ............................... 15/21 E

*Primary Examiner*—Edward L. Roberts
*Attorney*—Karl W. Flocks

[57] ABSTRACT

A car wheel washing apparatus comprising a movable frame, a pair of rotatable washing brushes mounted movably in the direction transverse to the direction of movement of the frame, and feeler means provided adjacent to the lower end of the movable frame for controlling the stopping of said movable frame and for controlling the transverse movement and the rotation of said washing brushes, said feeler means having a feeler arm adapted to contact with the outer periphery of a wheel on a car to be washed.

1 Claim, 2 Drawing Figures

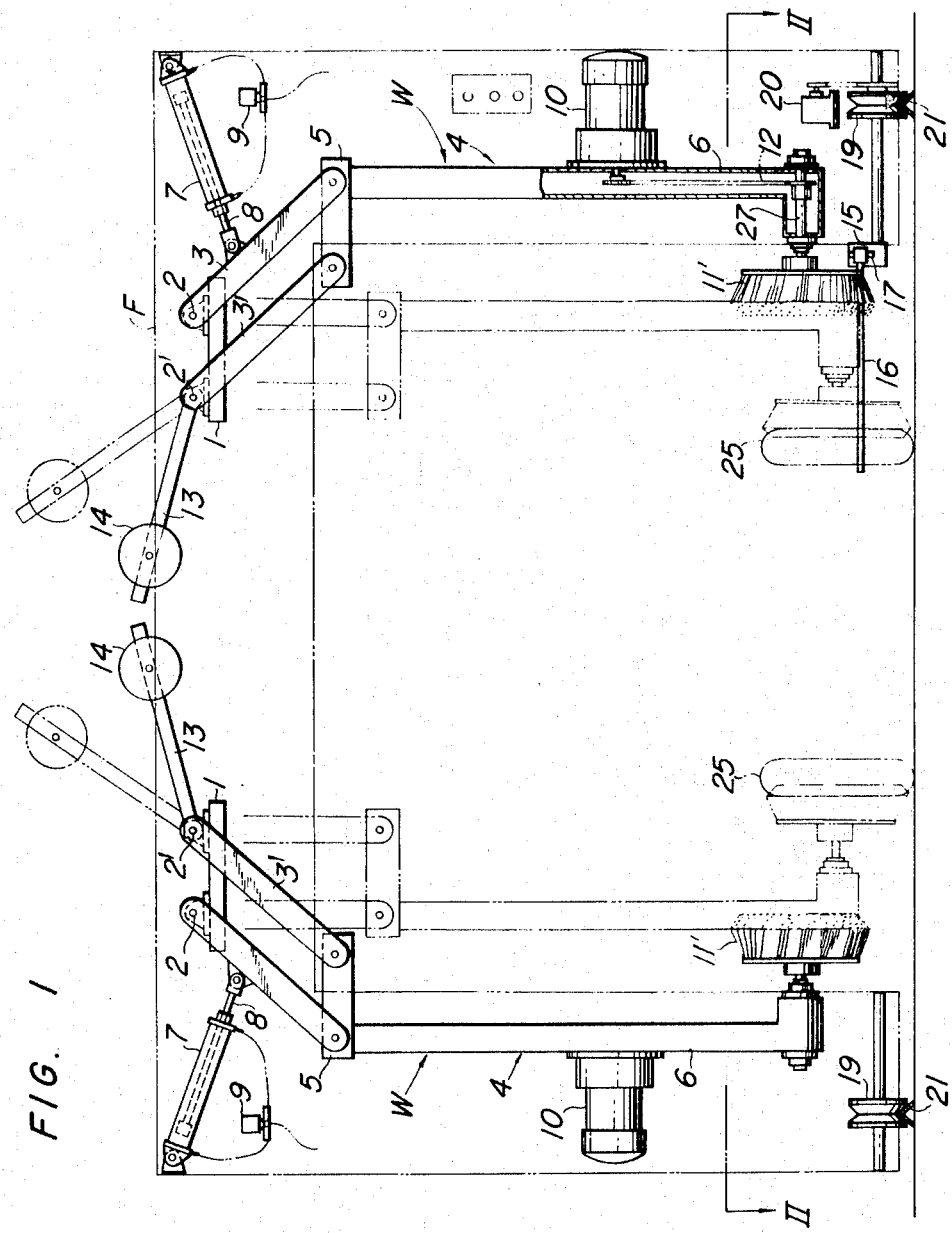

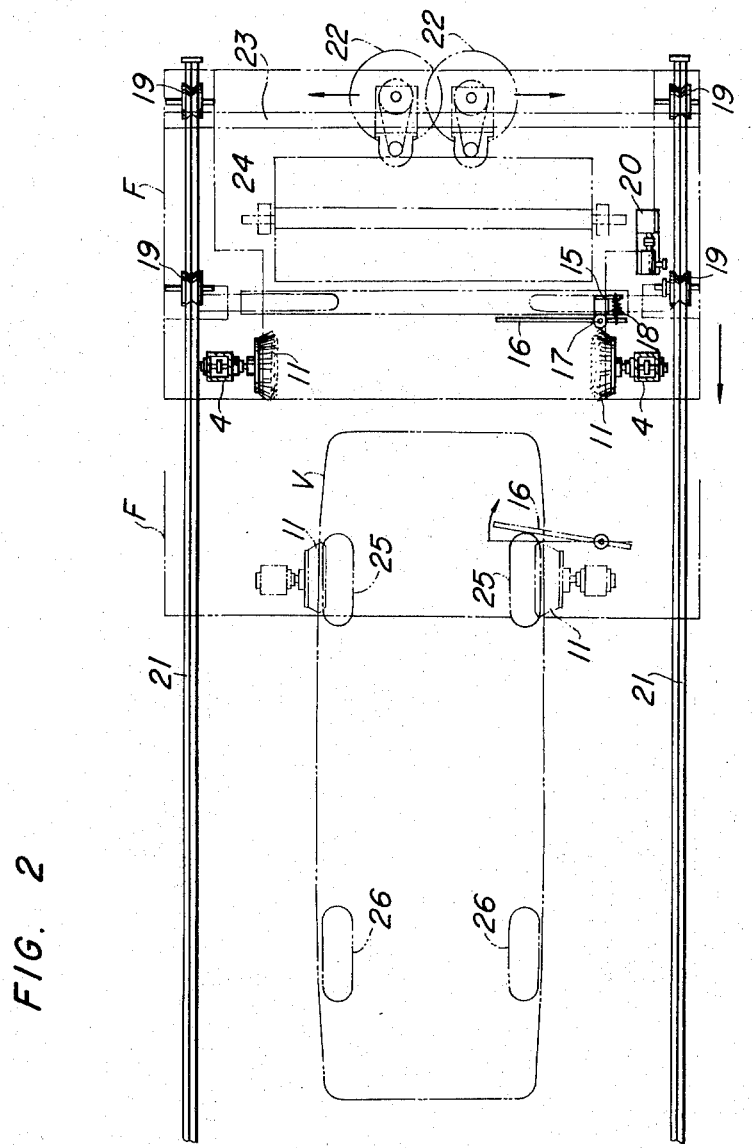

CAR WHEEL WASHING APPARATUS

BACKGROUND OF THE INVENTION

The present invention relates to an apparatus for washing car wheels and more particularly to an apparatus in which front and rear wheels of an automobile can be automatically washed by a pair of brushes mounted on a frame.

An object of the present invention is to provide an apparatus for washing car wheels in which washing brushes can be put into exact engagement with the outer surfaces of front and rear wheels of an automobile.

A further object of the present invention is to eliminate the necessity of providing means for adjusting the position of washing brushes.

Still further object of the present invention is to provide a car wheel washing means which is simple in construction and less expensive.

According to the present invention, there is provided an apparatus for washing car wheels which comprises a movable frame, a pair of rotatable washing brushes mounted movably in the direction transverse to the direction of movement of the frame, and feeler means provided adjacent to the lower end of the movable frame for controlling the stopping of said movable frame and for controlling the movement and rotation of said washing brushes, said feeler means having a feeler arm adapted to contact with the outer periphery of a wheel on a car to be washed.

With the novel feature of the feeler means provided in accordance with the present invention, the apparatus can be used on an automobile of any size and the brushes in the apparatus can be put into positive engagement with the outer surfaces of wheels.

The above and other objects and features of the invention will become apparent from the following descriptions of a preferred embodiment which proceeds taking reference to the accompanying drawings.

BRIEF DESCRIPTION OF THE DRAWINGS

FIG. 1 is a front view of a washing apparatus embodying the feature of the present invention; and FIG. 2 is a horizontal sectional view taken along the line A—A of FIG. 1.

DESCRIPTION OF THE PREFERRED EMBODIMENT

Referring to the drawings, the wheel washing apparatus embodying the present invention comprises a gate type movable frame F which carries a pair of identical washing mechanisms W mounted on the opposite sides of the upper part thereof. Since the washing mechanisms W are of the identical construction, only one of them will now be described. As shown in the drawings, each of the mechanisms W includes a pair of links 3 and 3' pivotally mounted at their upper ends by means of a pair of horizontally spaced shafts 2 and 2' on a bracket 1 secured to the upper member of the movable frame F. The links 3 and 3' have equal length and pivotally carry at their lower ends a horizontal upper element 5 of a movable member 4 having a shape of inverted L. The links 3 and 3' and the element 5 of the movable member 4 constitute a parallel linkage so that, when the links 3 and 3' pivot about their pivot shafts 2 and 2', the vertical element 6 of the movable member 4 is caused to move substantially horizontally without any angular movement. Thus, the washing mechanism W can be moved in the direction perpendicular to the direction of the movement of the frame F. An air cylinder 7 has a piston rod 8 connected to the intermediate portion of the link 3 and is pivotally mounted at the cylinder end on the upper corner of the movable frame F. The air cylinder 7 has ports at the opposite ends which are connected with a three-way valve 9. The valve 9 serves to connect the ports in the cylinder 7 alternately to an air tank (not shown) or to atmosphere.

The movable member 4 carries a prime mover 10 at its intermediate portion and has a dish-shaped washing brush 11 with backplate 11' rotatably carried at the lower end thereof. The washing brush 11 is so arranged that it is rotated on shaft 27 by the prime mover through a power transmission mechanism 12 disposed in the movable member 4.

An arm 13 having a weight at one end is secured at the other end to the support shaft 2' so that the arm 13 is swingable integrally with the link 3'. The weight 14 serves to bias the washing mechanism W outwardly toward the position shown by a solid line in FIG. 1. A sensing device such as a limit switch 15 is disposed at a position adjacent to both the lower end of the movable frame F and the washing brush 11. The limit switch 15 has a feeler 16 swingable about a vertical shaft 17. The feeler 16 is biased by a tension spring 18 acting between the root end of the feeler and the casing of the limit switch 15 or the movable frame F so as to extend inwardly from the frame F. Thus, the feeler 16 is normally placed in a position where it can engage with the outer periphery of a wheel on an automobile to be washed.

As shown in the drawings, the movable frame F has wheels 19 at the lower end of each vertical leg, one of which is driven as shown by means of a motor 20. The wheels 19 are arranged so as to roll on a pair of parallel guide rails 21. Further, in FIG. 2, the reference numeral 22 shows a pair of brushes for washing side portions of a car body to be washed. Each of the brushes 22 is mounted transversely movably along a guide rod 23. The reference numeral 24 shows a brush for washing the upper surface of the car body. The reference numerals 25 and 26 shows front and rear wheels of the car (V).

In operation, the automobile (V) to be washed is placed between the guide rails 21 and the prime mover 20 is started to move the movable frame F in the direction shown by an arrow in FIG. 2. When the feeler 16 of the limit switch 15 provided in one of the washing mechanisms W engages with the outer periphery of the front wheel 25 of the car (V) and swung about the vertical shaft 17 in the clockwise direction as seen in FIG. 2, the limit switch 15 is actuated to stop the rotation of the prime mover 20. Thus, the movable frame F is stopped and, at the same time, the motor 10 in each of the washing mechanisms W is operated to rotate the washing brush 11 and the three-way valve 9 in each mechanism W is actuated to extend the piston rod 8 of the corresponding air cylinder 7. The movable member 4 in each mechanism W is thus moved inwardly due to the swinging movement of the links 3 and 3', so that the washing brush 11 is put into contact with the outer surface of the corresponding front wheel 25 to wash the surface.

After the washing is completed, the prime mover 20 is again started such as by means of manual operation.

Then, the movable frame F is further moved in the same direction so that the feeler 16 of the limit switch is passed over the front wheel 25 and returned to the original position under the influence of the tension spring 18. Thus, the motor 10 and the washing brush 11 in each of the washing mechanisms W and, at the same time, the three-way valve 9 is actuated to retract the piston rod 8 so as to move each of the washing brushes 11 outwardly. The movable frame F is further moved until the feeler 16 engages with the outer periphery of the rear wheel 26 of the car whereupon the rear wheels 26 can also be washed in a manner similar to that previously described.

In the arrangement illustrated in the drawings, the brush 11 of each washing mechanism W is maintained at the outward retracted position under the influence of the weight 14 even when the air cylinder 7 is in the neutral position.

1. An apparatus for washing car wheels which comprises a gate type running frame movable in the longitudinal direction of a car to be washed striding over the car, a prime mover connected to said running frame for moving said running frame, a pair of moving frames provided in opposed relation on both sides of said running frame and movable in parallel relation in a direction perpendicular to the running direction of said running frame, driving means for moving said moving frames, brush driving shafts supported horizontally on said moving frames and extending in a direction perpendicular to the running direction of said running frame, secondary prime movers for driving said driving shafts, plate-shape wheel washing brushes including base plates fixed to the front ends of said brush driving shafts, and a large number of short brush hairs implanted on said base plates in a direction substantially perpendicular to the outer surfaces of the car wheels, and sensor means for controlling the operations of said prime mover and said secondary prime movers, said means including feelers projectable to positions in contact with the tread surfaces of said car wheels.

* * * * *